United States Patent [19]

Hukashima

[11] Patent Number: 5,206,785
[45] Date of Patent: Apr. 27, 1993

[54] VARIABLE CAPACITOR AND POSITION INDICATOR EMPLOYING VARIABLE CAPACITOR

[75] Inventor: Yasayuki Hukashima, Saitama, Japan

[73] Assignee: Wacom Co., Ltd., Tokyo, Japan

[21] Appl. No.: 740,580

[22] Filed: Aug. 6, 1991

[51] Int. Cl.⁵ .................. H01G 7/00; H01G 5/34
[52] U.S. Cl. ...................................... 361/283; 73/718
[58] Field of Search .................. 361/280, 283; 178/19; 340/706; 73/718

[56] References Cited

U.S. PATENT DOCUMENTS

| | | | |
|---|---|---|---|
| 3,993,939 | 11/1976 | Slavin et al. | 361/283 |
| 4,016,466 | 4/1977 | Frappart | 361/278 |
| 4,092,696 | 5/1978 | Boesen et al. | 361/283 |
| 4,736,076 | 4/1988 | Mochizuki et al. | 200/52 R |
| 4,786,765 | 11/1988 | Yamanami et al. | 178/19 |
| 4,823,230 | 4/1989 | Tiemann | 361/283 |
| 4,933,807 | 6/1990 | Duncan | 361/283 |
| 5,028,745 | 7/1991 | Yamanami et al. | 178/19 |

FOREIGN PATENT DOCUMENTS

| | | |
|---|---|---|
| 47-67704 | 6/1972 | Japan . |
| 50-103530 | 8/1975 | Japan . |
| 58-36461 | 3/1983 | Japan . |
| 58-54753 | 4/1983 | Japan . |
| 58-58660 | 4/1983 | Japan . |
| 58-159057 | 10/1983 | Japan . |
| 58-180303 | 11/1983 | Japan . |
| 61-8809 | 1/1986 | Japan . |

Primary Examiner—Donald A. Griffin
Attorney, Agent, or Firm—Lowe, Price, LeBlanc & Becker

[57] ABSTRACT

A variable capacitor comprises a solid dielectric disc having one electrode disposed on one face thereof. A flexible electrode is selectively urged into contact with a second face of the disc, parallel to the first face. A translatable stem drives the second electrode into contact with the first surface. The variable capacitor is used in an implement which is moved relative to a position detecting tablet. The variable capacitor is part of a tuned circuit having a resonant frequency approximately the same as the frequency of AC energy applied to coils of the position detecting tablet.

45 Claims, 4 Drawing Sheets

VARIABLE CAPACITOR AND POSITION INDICATOR EMPLOYING VARIABLE CAPACITOR

FIELD OF INVENTION

The present invention relates generally to variable capacitors and more particularly to a variable capacitor including a flexible electrode normally spaced by air from a surface of a solid dielectric and which is urged into contact with and has differing contact areas with the dielectric surface in response to differing forces being applied to the electrode.

The present invention is also related to an implement adapted to be used with a position locating tablet, and more particularly, to such an implement including a variable capacitor including a flexible electrode normally spaced by air from a surface of a solid dielectric, wherein the electrode is urged by a stem that is selectively pressed against a surface of the tablet.

BACKGROUND ART

Commonly assigned U.S. Pat. No. 4,786,765 and pending application Ser. No. 07/235,588, filed Aug. 24, 1988, disclose devices wherein the position of an implement, e.g., a pen, relative to a position detecting tablet is determined. Each stylus includes a tuned circuit having a resonant frequency approximately equal to the frequency of a wave derived from a coil arrangement of the tablet. The resonant frequency of the tuned circuit is varied slightly in response to differing characteristics associated with the pen. For example, the pen can be associated with differing colors, each having a different tuned circuit resonant frequency assigned to it. Alternatively, the pen includes a pressure transducer for varying the value of a reactance included in the pen as a function of pressure exerted by a stem of the pen on a surface of the tablet. The wave derived from the tablet coil arrangement is coupled to the tuned circuit, thence back to the tablet. The tablet responds to the wave coupled back to it to indicate the characteristic associated with the resonant frequency of the tuned circuit by comparing the phase angle of the wave supplied by the coil arrangement to the tuned circuit with the phase angle of the wave coupled back to the coil arrangement by the tuned circuit. In addition, the position of the implement is detected by coupling energy from the tablet to the implement. In the copending application, the same coil arrangement which enables the characteristic to be determined is used to detect implement position.

The tuned circuit of the prior art devices includes an inductor and capacitor series connected to each other, without any connection to a power supply. It is indicated in the '765 patent that the pressure responsive reactance can be a variable capacitor or a variable inductor. In the particular disclosed embodiment of the '765 patent, the variable inductance includes an elongated core or stem having a ferrite chip positioned therein so that the stem and chip are axially displaced and restored in response to a tip of the stem being urged against the tablet surface. Thereby, the resonant frequency of the tuned circuit is changed. The change in resonant frequency is detected as a change in phase angle.

A problem with the above-described structure is that as the ferrite chip is displaced with respect to the position of a coil which surrounds it, undesirable strokes are inevitably generated. The undesirable strokes occur because the stem must be translated on the order of 1 to 2 millimeters to achieve significant inductance change. The 1 to 2 millimeter displacement is significantly greater than the displacement of a conventional writing implement, such as a ballpoint pen or a felt tipped pen, during normal operation. Hence, a person using the prior art pen does not get the same feel that he has when using a conventional implement. It has also been observed that such displacement of the stem causes erroneous position indicating readings from tablets of the type disclosed in the co-pending application. In addition, the dynamic range of the inductance change is relatively low so that there are relatively small changes in the tuned circuit resonant frequency and therefore relatively small changes in the detected phase, as a function of stem displacement. Hence, the detection resolution of this prior art arrangement is relatively limited.

If the tuned circuit includes a conventional variable capacitor responsive to stem translation, a large force must be imparted to the stem relative to the normal pressure of a writing implement on a writing surface to provide a large capacitance dynamic range. The significant forces do not lend themselves to facile use of the implements when bearing against a surface of a tablet.

It is, accordingly, an object of the present invention to provide a new and improved variable capacitor having a large dynamic range in response to relatively small pressures and/or displacements being supplied to it.

A further object of the invention is to provide a new and improved variable capacitor having a large dynamic range, covering in excess of an order of magnitude, in response to a displacement of tens of micrometers of a mechanical element of the capacitor.

Another object of the invention is to provide a new and improved implement designed for use with a position detecting tablet, wherein the implement includes a variable capacitor having a large dynamic range associated with movement of a stem of the implement resembling the movement of the core of a writing implement.

The Invention

In accordance with one aspect of the present invention a variable capacitor comprises a housing including a solid dielectric having a first electrode thereon. A second flexible electrode is normally spaced by air from a surface of the solid dielectric. The normal spacing between the second electrode and the surface and the flexibility of the second electrode are such that the second electrode (a) is urged into contact with and has differing contact areas with the surface in response to differing forces being applied thereto and (b) returns to its normal spaced location from the surface in response to removal of the forces.

It has been found particularly advantageous, for various reasons, to space the flexible electrode from the solid dielectric surface when no force is applied to the flexible electrode, i.e., when the flexible electrode and the solid dielectric are in a normal or initial position. One reason for this construction is because the contacting areas of the solid dielectric flexible electrode and the solid dielectric surface have a tendency to collect moisture. If the flexible electrode and the solid dielectric surface were normally contacting each other, while the capacitor is not in use, the moisture in the contacting area would change the initial capacitance of the capacitor. In addition, the moisture has a tendency to make the flexible electrode and dielectric surface contacting area stick together to cause inaccuracies to develop in the relationship between displacement of the flexible electrode and capacitance between the electrodes. By spacing the flexible electrode from the solid dielectric when the stylus is not in use, the initial capacitance of the capacitor has a greater tendency to remain constant, and the sticking problem is generally obviated, resulting in greater accuracy relating translation of the flexible electrode to capacitance change.

By polishing the surface of the flexible electrode and the solid dielectric which selectively contacts the flexible electrode, repeatable force vs. capacitance variations are provided over a dynamic range in excess of one order of magnitude of capacitance; in one preferred embodiment, the dynamic range extends substantially linearly from 8 picofarads to about 100 picofarads in response to movement of the electrode from the spaced position to a fully contacting position. The linear relationship of the capacitance change is a function of translation of a stem that moves the flexible electrode into and out of contact with the polished dielectric surface to provide a high resolution of rod displacement with changes in capacitance. The repeated results occur because the contact area of the flexible electrode and the smooth, polished dielectric surface it engages is always virtually the same for the same deflection of the electrode. Thus there are no unpredictable gaps in the contact surface area.

A contributing reason for the repeatable high linearity and large dynamic range characteristics of the variable capacitor is that the surface of the stem which derives the flexible electrode is a sector of a sphere so that the initial contact point of the flexible electrode and the polished dielectric is almost always the same and the flexible electrode contact area virtually always increases and decreases in the same manner in response to the same translation of the stem.

Another contributing factor to the large dynamic range of the capacitor is the use of very high dielectric constant mixed metal ceramics, e.g. $TiO_2Sr_xO_y$, as the solid dielectric, in combination with the variable contact area flexible electrode. These ceramics have dielectric constants in excess of 1,000; in the specific embodiment, the dielectric constant of the solid dielectric is 7,000. The high dielectric constant of the solid dielectric also contributes to linearity of the response, such that there is only a slight change in capacitance of the capacitor when the flexible electrode goes from a spaced to a contacting condition against the solid dielectric polished surface.

Many mixed metal ceramics having high dielectric constants cannot be used for many applications because they have poor voltage breakdown characteristics. However, for the stylus application of the present invention, wherein the tuned circuit including the capacitor is not connected to any power supply source, relatively low voltages are usually developed across the capacitor. Thereby, the likelihood of high voltage dielectric breakdown is basically obviated.

Accordingly, in accordance with a further aspect of the present invention an implement for supplying position and pressure indications to a tablet on which the implement is adapted to be used comprises a stem adapted to be displaced in response to pressing thereof against a surface of the tablet in substantially the same manner that a writing implement is displaced when it is pressed against the tablet surface. A tuned circuit including an inductor and a variable capacitor having a capacity controlled by displacement of the stem is provided. The variable capacitor includes a solid dielectric having a dielectric constant in excess of 100 and fabricated of a material having a tendency to exhibit breakdown in response to relatively high voltage being applied to opposite surfaces thereof. The inductor and variable capacitor are in a passive circuit having no power supply terminals connected to it to obviate the tendency of the solid dielectric to be damaged by the application of high voltage. The variable capacitor further includes a first electrode on the solid dielectric. A second flexible electrode mechanically coupled to the stem is normally spaced by air from a surface of the solid dielectric when no force is applied to the stem. The arrangement of the flexible electrode and the surface of the second electrode are such that the second electrode (a) is urged into contact with and has differing contact areas with the dielectric surface in response to differing forces being applied to the second electrode by the stem and (b) returns to its normally spaced location from the surface in response to removal of the forces.

In accordance with a further aspect of the invention, an implement for supplying position and pressure indications to a tablet on which the implement is adapted to be used comprises an elongated housing having the shape of a pen and a longitudinal axis. The housing includes a stem translatable in the direction of the axis by an amount controlled by the pressure exerted by a tip of the stem that protrudes from the housing against a surface of the tablet. Translation of the stem is similar to translation of a similar structure of a writing implement, e.g., a ball of a ballpoint pen or a tip of a felt pen. A variable capacitor in the housing is mechanically coupled to the stem so the capacitance of the capacitor varies in response to translation of the stem in the axial direction. The capacitor includes a solid dielectric, a first electrode on the solid dielectric and a second flexible electrode normally spaced by air from a surface of the solid dielectric when the stem is in a quiescent state while no force is applied to it. The arrangement is such that the flexible electrode (a) is urged into contact with and has differing contact areas with the solid dielectric surface in response to differing forces being applied to the flexible electrode by translation of the stem in the axial direction and (b) returns to its normally spaced location from the dielectric surface in response to removal of the forces.

A further feature of the invention is that the flexible electrode and solid dielectric surface are always spaced from each other by the same short distance when the flexible electrode is not flexed by providing an annular spacer between them. The flexible electrode is driven through a central opening of the annular spacer into contact with the dielectric surface.

An additional feature of the invention is that an elastic membrane is located between the end of the stem that is a sector of a sphere and the flexible electrode. The elastic membrane functions somewhat like a shock absorber to prevent excessive forces from being applied to the flexible electrode and assists in maintaining uniform surface contact between the flexible electrode and the dielectric surface over the entire contact area region.

According to another feature of the invention a housing for the variable capacitor includes a pair of mating cylindrical portions which frictionally nest or mate with each other. All of the elements of the variable capacitor are initially inserted into one of the housing portions before the two housing portions are frictionally engaged with each other. The housing and electrical components are arranged so that there is only frictional contact between the electrodes and leads connected to them. The arrangement facilitates assembly, parts replacement and repair of the capacitor.

The above and still further objects, features and advantages of the present invention will become apparent upon consideration of the following detailed description of a specific embodiment thereof, especially when taken in conjunction with the accompanying drawings.

DESCRIPTION OF THE PREFERRED EMBODIMENT

Figure 1:
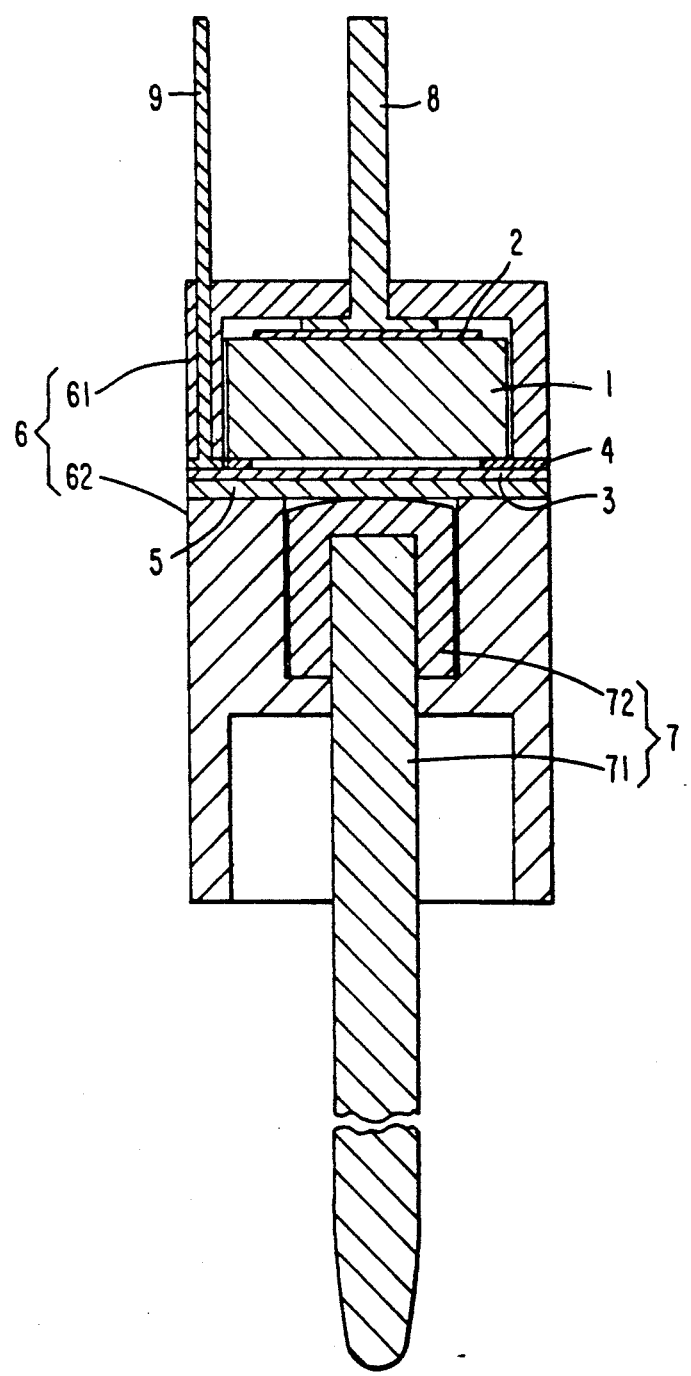
FIG. 1 is a cross sectional view of a variable capacitor according to a preferred embodiment of the present invention.
Figure 2:
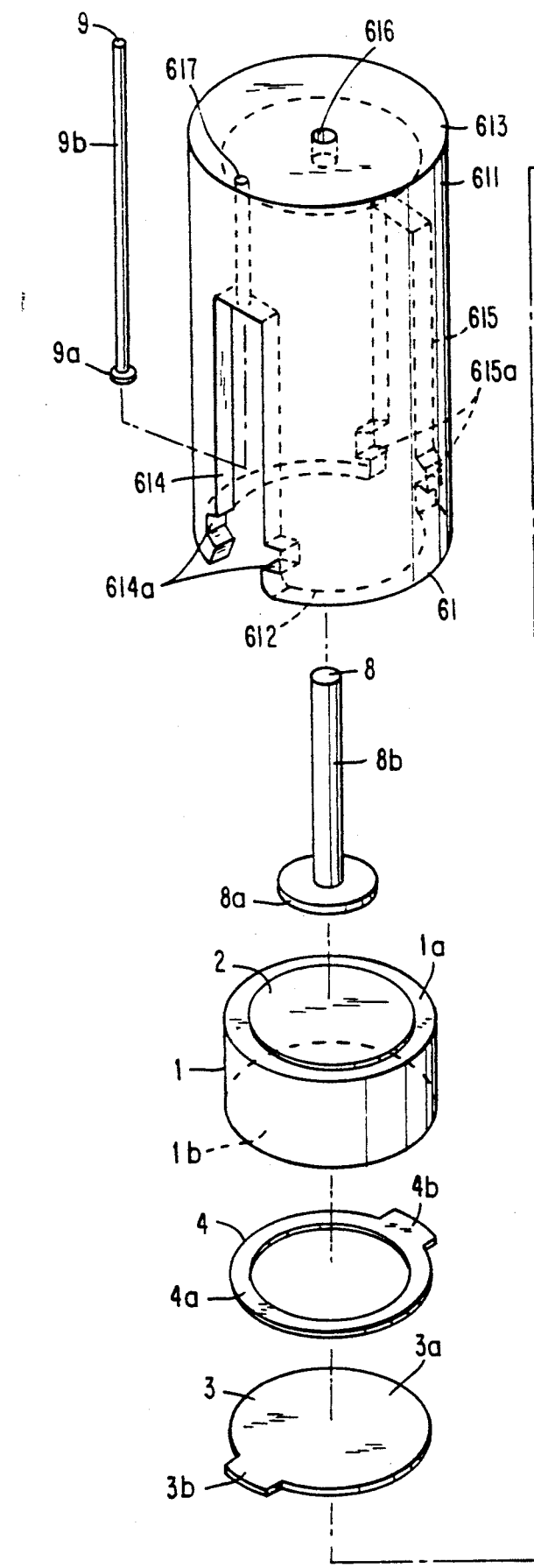
FIG. 2 is an exploded perspective view of the variable capacitor illustrated in FIG. 1.
Figure 2:
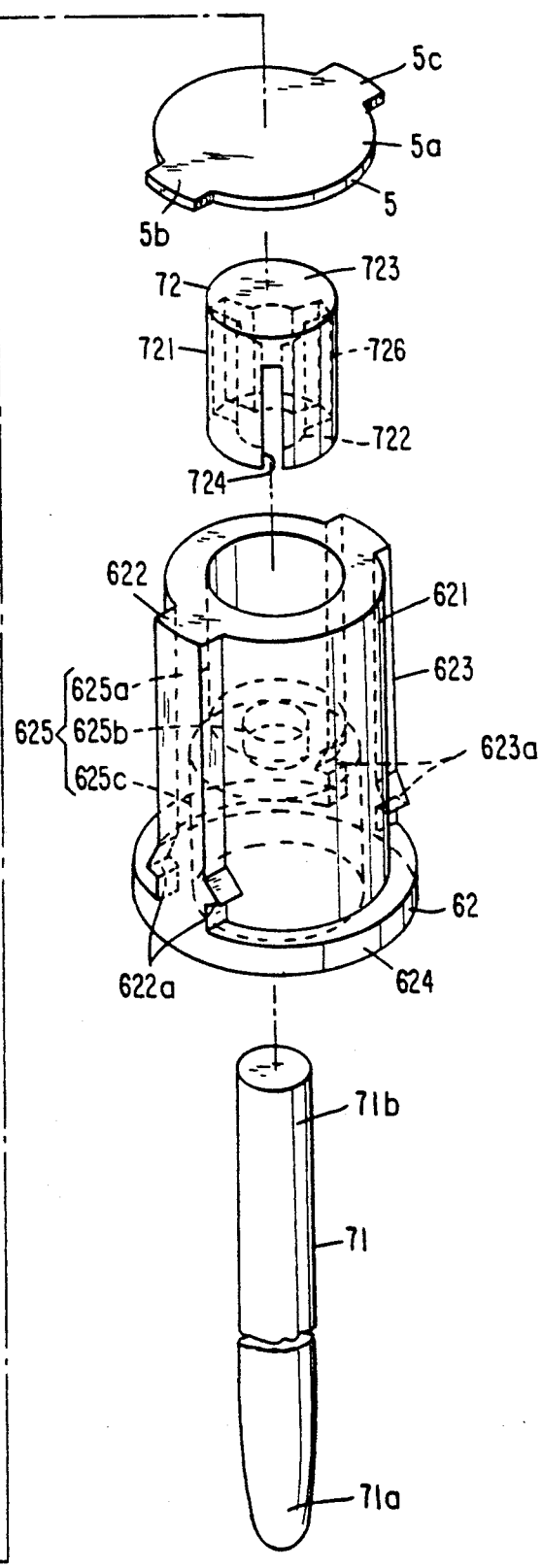
Figure 3B:
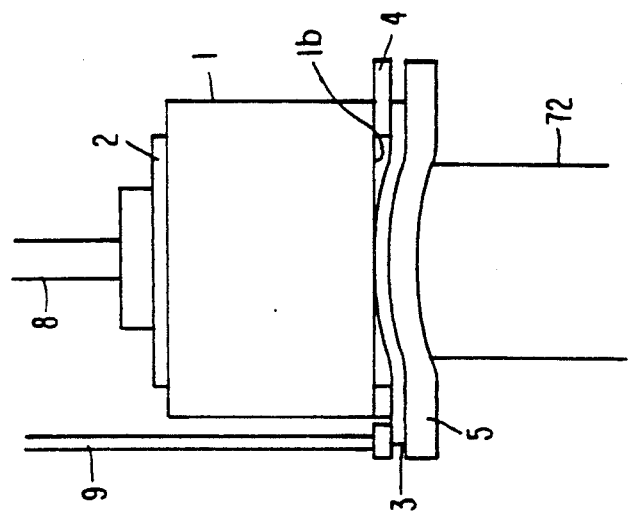
FIGS. 3A and 3B are illustrations of the relative positioning of the elements of the variable capacitor illustrated in FIGS. 1 and 2 when the capacitor is in its normal, initial position and when a flexible electrode of the capacitor is driven into engagement with a surface of a solid dielectric of the capacitor.
Figure 3A:
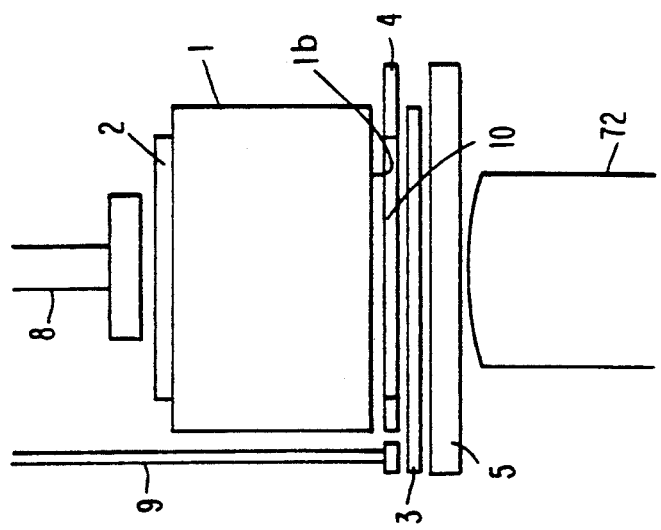

FIGS. 1-3 are illustrations of a preferred embodiment of a variable capacitor according to the present invention. The variable capacitor includes solid dielectric disc 1 having an upper planar face 1a to which is fixedly bonded metal electrode 2. Dielectric disc 1 includes a second planar face 1b opposite from and parallel to the face 1a. The variable capacitor includes a second, flexible electrode 3 that in initial operation is spaced from face 1b and which is selectively driven, with variable contact area, against face 1b by drive assembly 7 that is axially translated along the axis of disc 1. Electrode 3 is normally spaced from surface 1b by annular dielectric spacer 4, having opposite faces that engage facing surfaces of electrode 3 and face 1b of solid dielectric disc 1. Forces from drive mechanism 7 are transmitted to electrode 3 by elastic disc 5, preferably silicone rubber, to cause electrode 3 to be deflected into contact with face 1b through the central opening of annular or ring-shaped spacer 4. The entire assembly is located in dielectric housing 6, through which protrude metal terminals 8 and 9, respectively connected to electrodes 2 and 3. Dielectric disc 1 is preferably made of a mixed metal ceramic, $TiO_2Sr_4O_y$, having a thickness of 2 millimeters, a diameter of 4.6 millimeters, and a dielectric constant of 7000. Electrode 2 is a disc-like silver plate adhered by scintering to surface 1a; electrode 2 has a thickness of 0.2 millimeters and a diameter of 4.0 millimeters.

Electrode 3 is formed by evaporating, preferably by sputter coating, a nicrome film to a thickness of 1000 Angstroms on a flexible electrically insulating polyimide film having a thickness of 75 micrometers. Electrode 3 includes a circular portion 3a having a diameter of 4.6 millimeters and a radially extending tab 3b for connecting circular portion 3a to terminal 9.

Spacer 4 is an electrically insulating polyimide film having a thickness of 40 millimeters and a dielectric constant of 3.5. Spacer 4 includes annular body 4a having an outer diameter of 4.6 millimeters and an inner diameter of 3.3 millimeters. Spacer 4 also includes an outwardly directed projection or tab 4b, which assists in holding the spacer in situ.

Electrically insulating elastic disc-like membrane 5, made of silicone rubber, has a thickness of 0.35 millimeters and includes circular body portion 5a having a diameter of 4.6 millimeters and two diametrically opposed outwardly directed tabs 5b and 5c which help to secure the membrane in situ. Surface 1b of dielectric disc 1 is ground, i.e., polished, so it has a smooth surface with a roughness no greater than 0.1 micrometer.

Electrically insulating housing 6 includes top and bottom portions 61 and 62, both made of a rigid synthetic resin, preferably polyimide including glass fibers. Top housing portion 61 has a substantially cylindrical shape, including sidewall 61 in which are provided axially directed, elongated slots 614 and 615 that are diametrically opposed to each other. Slots 614 and 615 extend upwardly from bottom planar end face 612, configured as a ring; the slots extend toward planar upper face 613 of housing portion 61. The portions of slots 614 and 615 in proximity to end face 612 include circumferentially extending securing recesses 614a and 615a. Upper face 613 includes central axially extending bore 616 through which terminal 8 extends into a cavity defined by the interior of housing portion 61. Elongated bore 617, in proximity to side wall 611, extends from the end of slot 614 remote from end face 61 in the axial direction to end face 613. Terminal 9 extends through bore 617.

Lower housing portion 62 includes a generally cylindrical body 621, configured to be received by and frictionally nest with upper housing portion 61. Projections 622 and 623 extend outwardly from diametrically opposed portions of the sidewall of body 621 and are configured to be received by slots 614 and 615. Projections 622 and 623 include, toward the base of member 621, outwardly extending regions 622a and 623a, respectively received by securing recesses 614a and 614b of housing portion 61. Annular boss 624, having the same outer diameter as the outer diameter of cylindrical sidewall 611 of housing portion 61 is at the base, i.e., bottom, of body 621 of housing portion 62. Housing portion 62 is a unitary, preferably molded body including body 621, projections 622 and 623, as well as boss 624. Wall 621 includes central throughhole 625, composed of portions 625a, 625b and 625c having differing inner diameters.

Body 62, dielectric disc 1, circular portion 3a of electrode 3, circular portion 4a of spacer 4 and circular portion 5a of elastic member 5 have the same outer diameter. Projections 622, 623, tab 3b of electrode 3, tab 4b of spacer 4 and tabs 5b and 5c of elastic disc 5 have the same geometric shape and dimensions.

Drive member 7 includes elongated stem 71 to which is secured cap 72 that abuts against the lower face of elastic disc 5, i.e., the face of disc 5 remote from the polyimide film which carries electrode 3. Stem 71 is a hard electrically insulating material, a polyimide containing ceramic, while cap 72 is a rigid electrically insulating material, a polyimide containing glass fibers. Stem 71 has an outer diameter slightly smaller than the inner diameter of portion 625 of throughhole 623 in housing portion 62. End portion 71a of stem 71 has a semispherical shape so that the stem can easily be moved across a surface, such as a position detecting tablet. Cap 72 has a generally cylindrical shape and an end wall 723, remote from end portion 71a of stem 71, that engages membrane 15. End wall 723 of cap 72 is a segment of a sphere having a relatively large radius, so that the curvature of end face 723 is relatively small. The center of end wall 723 engages the center of rubber silicon disc 5, which in turn contacts the face of the polyimide film opposite from the face of the polyimide film on which electrode 3 is deposited.

The outer diameter of cap 72 is slightly less than the inner diameter of portion 625a of throughhole 625 formed in housing portion 62. The length of cap 72 is substantially the same as the length of portion 625a. Cap 72 includes an axially extending bore having a diameter slightly less than the outer diameter of core 71. Sidewall 721 of cap 72 includes elongated slots 724, 725 and 726, each of which extends in the axial direction of the cap from annular end wall 722 of the cap which is opposite to and generally parallel to end wall 723. Slots 724, 725 and 726 are equiangularly displaced from each other about the periphery of sidewall 721.

Terminals 8 and 9 respectively include metal discs 8a and 9a, having planar faces bonded to metal cylindrical leads 8b and 9b. Leads 8b and 9b respectively have outer diameters slightly less than the inner diameter of bores 16 and 17 in housing portion 61. Terminal 8 is formed by plating nickel onto brass, while terminal 9 is formed by plating gold onto brass.

The method of assembling the variable capacitor is now described. Initially, terminals 8 and 9 are loaded into housing portion 61 by inserting cylindrical leads 8b and 9b into bores 616 and 617 respectively, so that discs 8a and 9a are disposed within housing portion 61. Then dielectric disc 1, spacer 4, the polyimide film carrying electrode 3 and elastic disc 5 are stacked together in the named order and inserted into housing portion 61 through the opening in annular end face 612. Dielectric disc 1 is inserted into housing portion 61 so that electrode 2 on top face 1a of the dielectric disc engages the bottom face of metal disc 8a of terminal 8. The polyimide film which carries electrode 3 is positioned so that the metal electrode film is spaced from polished lower surface 1b of dielectric 1, with the periphery of the polyimide film engaging the bottom face of spacer 4. The polyimide film carrying electrode 3 and spacer 4 are arranged so that radially extending tabs 3b and 4b thereof are diametrically opposed from each other. Metal tab 3b which is integral with the metal circular region 3a on the polyimide film carrying electrode 3 is inserted into slot 614, while tab 4b on spacer 4 is inserted into slot 615. Tabs 5b and 5c of elastic disc 5a respectively fit into slots 614 and 615. Tab 3b engages the bottom face of disc 9a.

Cap 72 is then inserted into portion 625a of throughhole 625 in housing portion 62 in such a manner that end wall 723 of the cap protrudes axially through hole 625. Housing portion 62 is then inserted into housing portion 61 through the opening in annular end wall 612. Housing portions 61 and 62 are then coupled to each other in such a manner that projections 622 and 623 are inserted into corresponding slots 614 and 615, respectively. In addition, securing detents 622a and 623a are frictionally engaged to securing recesses 614a and 615a, to frictionally secure housing portions 61 and 62 to each other. The arrangement and dimensions of housing portions 61 and 62 are such that there is a predetermined force between the various elements, in particular between electrode 2 and the lower face of disc 8a and between tab 3b of electrode 3 and disc 9a of terminal 9. Hence, only frictional contact is provided between terminals 8 and 9 and electrodes 2 and 3, respectively, and no bonding agents are necessary between the terminals and corresponding electrodes.

The last assembly step is to insert end portion 71b of stem 71 into cap 72 and to secure end portion 71b to the cap after the end portion has passed through portions 625b and 625c of throughhole 625 in housing portion 62.

Another method causes stem 71 and cap 72 to be coupled to each other so they are accommodated in housing portion 62 before housing portion 62 is inserted into housing portion 61. If this procedure is used, electrodes 2 and 3 and spacer 4 hold dielectric 1 between them to form a capacitor.

In operation, when no pressure is applied to stem 71, i.e., when the stem is in its initial position, smooth polished surface 1b of dielectric 1 and metal electrode film 3 are spaced from each other by a distance corresponding to the thickness of spacer 4, except for the peripheral portions of dielectric surface 1b and electrode film 3. As a result, air gap 10 is established between surface 1b and the metal film comprising electrode 3. The capacitor, when in its initial state with no force being applied by stem 71 to a tablet, is basically a capacity which extends from electrode 2 through the thickness of dielectric disc 1 to disc surface 1b in series with the capacity of the air gap between surface 1b and electrode 3. Thus, a relatively small initial capacitance, 8 picofarads in one embodiment, is provided when the variable capacitor is in the initial state. Because the dielectric constant of the air gap between electrode 3 and surface 1b is so much less than the dielectric constant of dielectric disc 1, the contribution of the air gap to the total capacitance between electrodes 2 and 3 when stem 71 is in the initial condition is relatively insignificant, typically being approximately 1 percent of the capacitance contribution of the solid dielectric.

In response to stem 71 being translated axially toward disc 1, end face 723 bends silicone rubber disc 5 through the central opening in spacer 4, to engage surface 1b. Thereby, the capacitance subsists from electrode 2, through the dielectric of disc 1 to the contact surface area of electrode 3 with surface 1b. As the contact area of electrode 3 and surface 1b increases, the capacitance between electrodes 2 and 3, and therefore between terminals 8 and 9, increases substantially linearly. The surface area of electrode 3 against surface 1b is linearly related to translation of stem 71, by virtue, inter alia, of the curvature of end face 723 and the deflection force imparted thereby to electrode 3 by silicone rubber disc 5 and the polyimide film which carries electrode 3. Thereby, there is a linear relationship between the displacement of stem 71 and the capacitance between terminals 8 and 9. Displacements of stem 71 of very small amounts, corresponding with the displacement of a ball of a ballpoint pen or the tip of a felt pen, result in variations in capacitance between terminals 8 and 9 in excess of an order of magnitude; in the preferred embodiment, the capacitance variation between terminals 8 and 9 is from 8 picofarads to 100 picofarads in response to a displacement of stem 71 of several tens of micrometers.

Spacer 4 enables dielectric disc surface 1b and electrode 3 to be spaced from each other by a predetermined distance under initial conditions, i.e., when no force is applied by stem 71 to the electrode through silicone rubber disc 5 and the polyimide film on which electrode 3 is deposited. Because of the predetermined fixed spacing between electrode 3 and surface 1b the capacity between terminals 8 and 9 in the initial condition of the capacitor is fixed in a relatively narrow range, i.e., dispersion of initial condition capacity is relatively low. If electrode 3 and surface 1b were initially in contact with each other, there is a tendency for a wide dispersal in the initial condition capacitance between terminals 8 and 9. The wide dispersion in capacitance between terminals 8 and 9 under these initial conditions occurs because repeated use of the structure has a tendency to permanently change the initial surface area contact between the electrode and surface 1b. This tendency is obviated by separating electrode 3 from surface 1b after each use. In addition, there is a tendency for moisture to stick to surface 1b while electrode 3 contacts surface 1b. By separating surface 1b and electrode 3 during initial conditions, the tendency for water molecules to stick to surface 1b is to a certain extent obviated. In one preferred embodiment, the region between surface 1b and electrode 3 is hermetically sealed to prevent intrusion of dust and water vapor in the gap between the electrode and surface.

As a result of the foregoing factors, stable performance of the variable capacitor is provided for a prolonged time interval over many cycles of operation of stem 71 urging electrode 3 into contact with surface 1b.

Because housing 6 includes housing portions 61 and 62 which are fixedly connected to each other, virtually the same force is always applied to each of silicone rubber disc 5, spacer 4, the polyimide film carrying electrode 3, electrode 3 and spacer 4 when the same force is applied to stem 71. Thereby, virtually the same capacitance changes occur between terminals 8 and 9 for the same force which is applied by stem 71 to electrode 3. In addition, substantially the same forces are applied to electrode 3 when no force is applied to stem 71. Therefore, undesirable changes in initial capacitance in the event of impact or vibrations are avoided. In addition, the variable capacitor of the present invention is easily manufactured at low cost.

Because surface 1b is smooth and polished, this surface and electrode 3 are maintained in planar contact with each other over the entire region from the center of the electrode to the periphery of the electrode portion in contact with surface 1b. As a result, the capacitance between terminals 8 and 9 is the same for the same displacement of stem 7. By highly polishing surface 1b to the low roughness level of 0.1 micrometer or less, the durability of surface 1b is enhanced. Typically, the unpolished surface roughness of the face of a mixed metal ceramic dielectric disc of the type employed for disc 1 is several tens of micrometers, depending upon the size of crystalline particles forming the dielectric disc. Such surface characteristics would result in random surface contact area between electrode 3 and the surface of the dielectric disc and a wide dispersion of capacitance values for the same displacement of stem 71. By polishing surface 1b to a roughness of 0.1 micrometers or less, repeated capacitance versus displacement variations responses are achieved.

It is to be understood that in certain instances spacer 4 can be eliminated and other structures can be used for providing the gap between electrode 3 and surface 1b. For example, a dielectric projection can be formed on a portion of dielectric disc 1, such as face 1b, to have the same configuration as spacer 4. Alternatively, the function of spacer 4 can be provided by evaporating a thick dielectric film on the face of electrode 3 facing surface 1b by using known printed circuit technology.

It is also possible to reverse electrode 3 and dielectric disc 1 so that disc 1 is engaged by drive member 7. Tip 71 of drive member 7 can also be configured as a polyhedron, instead of a semispherical surface.

Figure 4:
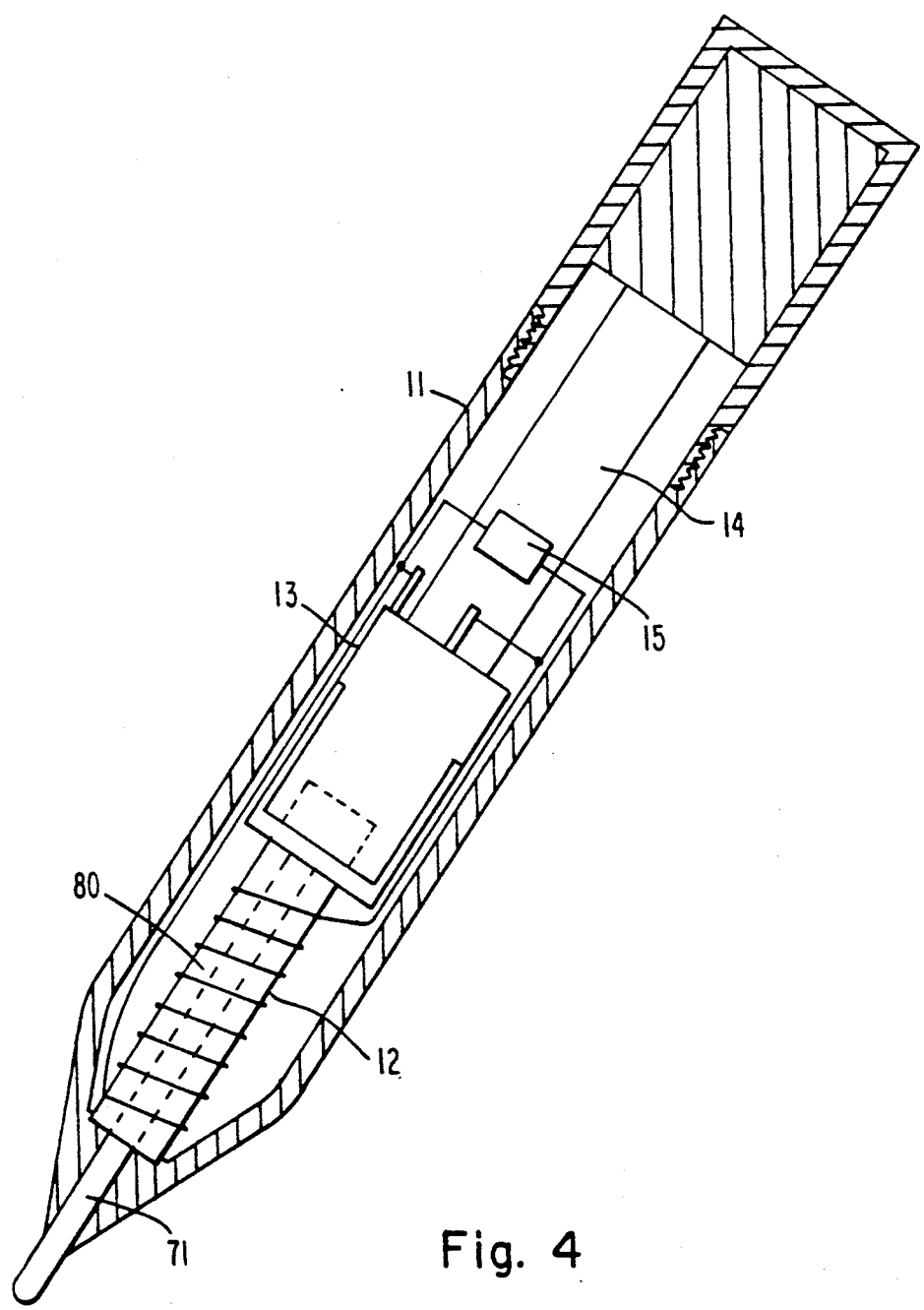
FIG. 4 is a cross sectional view of a pen that is used in combination with a position detecting tablet, wherein the pen includes a variable capacitor in accordance with the preferred embodiment of the invention.

FIG. 4 is an illustration of a position indicator, in the form of a pen including the variable capacitor described in connection with FIGS. 1-3. The position indicator is particularly adapted to be used in a tablet of the type described in the aforementioned, copending application wherein an indication of the location of the position indicator on the tablet is obtained, as is an indication of the pressure exerted by pen stem 71 on the tablet. The pressure indication is correlated with the width of a line being drawn on the tablet by a writing structure, such as a ball of a ballpoint pen or a felt tip of a pen. In certain instances, no line is drawn on the tablet; in such an instance, the radius of a virtual image imparted by the pen to the tablet is derived. The tablet transmits signals to a suitable display unit, as well known to those skilled in the art, and as described in the aforementioned patent and application.

The pen illustrated in FIG. 4 includes elongated housing 11 within which are located inductor or coil 12, variable capacitor 13 of the type described in conjunction with FIGS. 1-3, printed circuit board or substrate 14 and fixed capacitor 15.

Pen housing 11 is made of a non-metallic, electrically insulating material, such as a synthetic resin or plastic. Housing 11 includes, at the lower or front portion thereof, a throughhole into which stem 71 is inserted. Coil 12 is a Litz wire wound as a helix on cylindrical ferrite core 80 having an elongated bore through which stem 71 is inserted. Litz wire is employed for coil 12 because it has relatively low high frequency resistance. Stem 71 is positioned in the longitudinally extending bore of ferrite core 80 so that the stem can be translated axially of the ferrite cylindrical core and of housing 11. Ferrite core 12 is held between the front portion, i.e., tip, of housing 11 and protrudes into variable capacitor 13, where it is held. In particular, the end of coil 12 remote from the tip of housing 11 fits into and is held in portion 625c of throughhole 625 in housing portion 62 of variable capacitor 13.

Capacitors 13 and 15 are fixedly mounted on printed circuit board 14. One end of printed circuit board 14 is secured to end face 613 of housing portion 612 of variable capacitor 13. The other end of printed circuit board 14 is fixedly mounted to the end of pen housing 11 opposite from the end of the pen housing where stem 71 is located. A projection may be integrally formed on end face 613 to which the first mentioned end of printed circuit 14 is secured.

Fixed capacitor 14, preferably a chip capacitor, is connected in parallel with capacitor 13, by virtue of connections of terminals of the chip capacitor to terminals 8 and 9, which are also connected to opposite ends of coil 12. With stem 71 in its normal, initial position so that electrode 3 is spaced from surface 1b, the resulting tuned circuit including capacitors 13 and 15 and coil 12 has a predetermined resonant frequency which is slightly offset from the frequency of AC energy applied to coils included in the tablet which derives signals for detecting the position of pen 11 thereon. In the initial condition of stem 71 the capacitance of capacitor 13 is small compared to the capacitance of capacitor 15.

Therefore, the resonant frequency of the tuned circuit is substantially determined by the inductance of coil 11 and the capacitance of capacitor 15. In response to stem 71a being pressed against the tablet with a pressure exceeding a predetermined level, the capacitance of variable capacitor 13 increases from about 8 picofarads to a maximum value of approximately 100 picofarads. The increase in capacitance of variable capacitor 13 influences the resonant frequency of the tuned circuit so that there is a resultant phase angle change of a wave coupled by the pen back to the tablet relative to the apparent phase angle of the wave initially applied to the tablet. This phase angle change is detected to enable detection of the presence of pen 11 on the tablet and of the pressure exerted by stem 71 on the tablet.

Hence, with the position indicating pen 11 illustrated in FIG. 4, the resonant frequency of the tuned circuit is significantly changed between a state where a pressure exceeding a predetermined level is not applied and a state where a pressure equal to or greater than a predetermined level is applied. Therefore, switch-like information can be derived from pen 11, without the expense or maintenance problems of a switch. The resonant frequency of the tuned circuit is continuously changed in proportion to the pressure exerted by stem 71 on the tablet. As a result, continuous information about the writing pressure of pen 11 against the tablet is transmitted to the tablet.

No power supply of any type is included in pen housing 11. Instead, the circuitry in the pen housing is responsive to electric waves coupled from coils of the tablet to coil 12 and to capacitors 13 and 15. Because no power supply source is included in pen 11, the amplitude of electric current flowing in the tuned circuit is relative small. In the prior art, wherein a switch is generally employed to connect the inductor and capacitor(s) when the pen interacts with the tablet, dirt on the switch contacts frequently increases the impedance of the tuned circuit such that the pen has relatively short life. However, with the pen of the present invention, wherein the capacitance variation of variable capacitor 13 is approximately one order of magnitude, the presence of pen 11 on the tablet can be easily detected, without the need for a switch to connect the capacitor and coil elements.

Because variable capacitor 13 has a wide dynamic range of capacitance values in response to very small displacements of stem 17 (several tens of micrometers or less) commensurate with the displacement of a writing implement of a conventional ballpoint or felt tip pen, high resolution of the pressure variations is obtained. In addition, the small forces which are imparted by stem 71 to electrode 3 are commensurate with the forces applied by a conventional ballpoint or felt tip pen to a writing surface. Smooth operation, similar to that associated with a ballpoint pen or felt tip pen, is thus provided with a pen constructed in accordance with FIG. 4.

In the illustrated, preferred embodiment, silicone rubber disc 5 and the polyimide film carrying electrode 3 move in the same direction as the longitudinal axis of pen housing 11. It is to be understood, however, that the movable elements of the variable capacitor can be positioned so they are translated at right angles to the longitudinal axis of pen housing 11. In such a situation, a control button, in the form of an elastic membrane, is located on the sidewall of housing 11 and is depressed by a finger of the operator as he is moving a stem of the pen along the tablet.

In summary, because of the air gap between electrode 3 and surface 1b of dielectric disc 1 there is a relatively small capacitance between electrodes 1 and 2 in the initial condition of the variable capacitor of the invention. In response to a predetermined pressure or displacement being applied by stem 71 to electrode 3, electrode 3 and surface 1b contact each other, causing a predetermined capacitance to subsist between terminals 8 and 9. As additional pressure and a greater displacement of stem 71 occur, the contact area between electrode 3 and surface 1b increases, resulting in increased capacitance between electrodes 2 and 3. Thereby, a variable capacitor in accordance with the present invention has a capacitance which can be changed considerably in response to a small change in displacement of stem 71.

Because surface 1b is polished smooth, surface 1b and flexible electrode 3 are accurately maintained in planar contact with each other throughout the contact region thereof in response to displacement of stem 71. Therefore, there is a fixed relationship between the variable contact area between electrode 3 and surface 1b as a function of displacement of stem 71. Consequently, there is a relatively low dispersion in the capacitance between terminals 8 and 9 for like displacements of stem 71 and surface 1b has a long life.

By employing annular spacer 4 as the means for positioning electrode 3 from surface 1, the spacing between electrode 3 and surface 1b is relatively short, corresponding to the thickness of the spacer, except for the peripheral portions of the dielectric, spacer and electrode. As a result, there is a relatively small dispersion of the capacitance values which subsist between terminals 8 and 9 when no pressure is exerted on stem 71. In addition, there are few undesirable variations in the capacitance between terminals 8 and 9 which could result from repeated use of the capacitor if electrode 3 and surface 1b were in contact with each when no pressure is applied to stem 71. These undesirable variations would have been due to repeated use and the likelihood of moisture sticking to surface 1b. The stated relationship of surface 1b and electrode 3 enables a hermetic seal to be provided around these parts, to prevent invasion of dust and moisture. In consequence, stable performance is maintained for a significant time interval.

All of the elements are stably held in housing 6 by virtue of the manner in which the various parts fit together. In particular, stem 71 for displacing electrode 2 is in housing portion 61 in which are also located dielectric disc 1, electrode 2, electrode 3, spacer 4 and membrane 5. Stem 71 is arranged so that it moves in a direction perpendicular to surfaces 1a and 1b of dielectric disc 1. The displacement applied to the end of stem 71 is transmitted to electrode 3 via the end of stem 71 that is located in the housing. This relationship enables a stable relationship of capacitance changes with movement of stem 71 to be obtained.

Assembly of housing 6 is facilitated by forming housing portions 61 and 62 as cylinders which are arranged so that housing portion 61 is fastened to housing portion 62.

End cap 72 includes end face 723, shaped as a segment of a sphere abutting against a planar face of silicone rubber disc 5. This enables electrode 3 and surface 1b of dielectric disc 1 to always initially contact each other at the central portions thereof. The capacitance between terminals 8 and 9 thus changes substantially linearly in response to corresponding translations of stem 71. In addition, this construction enables the capacitance between terminals 8 and 9 to be virtually the same over the life of the pen at the time of initial contact between electrode 3 and surface 1b.

Because elastic disc 5 is disposed between electrode 3 and end face 723 of drive member 7, the pressure or displacement of the drive member is moderately applied to electrode 3. This is important because it enables the spring-like characteristics of the electrode to be retained over many cycles of operation. The segmented spherical shape of end face 723 enables the entire surface of electrode 3 to be brought into contact with virtually the entire area of surface 1b, to assist in the wide dynamic range which is provided by the capacitor of the present invention.

Because end cap 72 is easily detached from end 71b of stem 71 and the stem is made of a hard material, the end cap can be replaced, as needed, in the event of wear of end face 723 such that it no longer has a surface defined by a segment of a sphere.

The use of the variable capacitor in a stylus has considerable advantages because of the relatively large changes in resonant frequency of the tuned circuit including variable capacitor 13, fixed capacitor 15 and coil 12 in response to displacement of stem 71 which varies the capacitance of capacitor 13. As a result, information corresponding to the presence and absence of pen 11 on a tablet is obtained, without the need for a switch, as is an indication of the pressure exerted by the stem on a surface of the tablet.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A variable capacitor comprising a solid dielectric, a first electrode on the solid dielectric, a second flexible electrode normally spaced by a dielectric gas from a surface of the solid dielectric, the normal spacing between the second electrode and the surface and the flexibility of the second electrode being such that the second electrode (a) is urged into contact with the surface in response to an initial force being applied to the second electrode, (b) has differing contact areas with the surface in response to differing forces greater than the initial force being applied thereto and (c) returns to its normally spaced location from the surface in response to removal of the forces.

2. The capacitor of claim 1 further including a stem mechanically coupled to the flexible electrode for imparting said forces to the flexible electrode.

3. The capacitor of claim 1 further including means for imparting mechanical motion to the flexible electrode in response to said forces, said means for imparting mechanical motion including a surface shaped as a segment of a sphere for imparting motion to the flexible electrode to cause the flexible electrode to initially always contact substantially the same region on the solid dielectric surface in response to the initial force being applied thereto and to increase the contact area between the flexible electrode and the solid dielectric surface as the forces increase.

4. A variable capacitor comprising a solid dielectric, a first electrode on the solid dielectric, a second flexible electrode normally spaced by a dielectric gas from a surface of the solid dielectric, the normal spacing between the second electrode and the surface and the flexibility of the second electrode being such that the second electrode (a) is urged into contact with and has differing contact areas with the surface in response to differing forces being applied thereto and (b) returns to its normally spaced location from the surface in response to removal of the forces, said surface of the solid dielectric being sufficiently smooth and flat that there are virtually no portions between the center and periphery of the contact area region where contact between the solid dielectric surface and the electrode does not exist.

5. A variable capacitor comprising a solid dielectric, a first electrode on the solid dielectric, a second flexible electrode normally spaced by a dielectric gas from a surface of the solid dielectric, the normal spacing between the second electrode and the surface and the flexibility of the second electrode being such that the second electrode (a) is urged into contact with and has differing contact areas with the surface in response to differing forces being applied thereto and (b) returns to its normally spaced location from the surface in response to removal of the forces, an annular spaced between the dielectric surface and the electrode for establishing the normal spacing, the annular spacer and dielectric surface being arranged so that the electrode is flexed into contact with the dielectric surface through a central opening of the spacer.

6. A variable capacitor comprising a solid dielectric, a first electrode on the solid dielectric, a second flexible electrode normally spaced by a dielectric gas from a surface of the solid dielectric, the normal spacing between the second electrode and the surface and the flexibility of the second electrode being such that the second electrode (a) is urged into contact with and has differing contact areas with the surface in response to differing forces being applied thereto and (b) returns to its normally spaced location from the surface in response to removal of the forces, a housing in which the solid dielectric, first electrode and second electrode are located and a mechanical drive mechanism for translating the flexible electrode into contact with said dielectric surface, said mechanical drive mechanism including a stem having one end in the housing mechanically coupled to the flexible electrode and a second end extending outside of the housing so that translation of the stem relative to the housing results in translation of the flexible electrode.

7. A variable capacitor comprising a solid dielectric, a first electrode on the solid dielectric, a second flexible electrode normally spaced by a dielectric gas from a surface of the solid dielectric, the normal spacing between the second electrode and the surface and the flexibility of the second electrode being such that the second electrode (a) is urged into contact with and has differing contact areas with the surface in response to differing forces being applied thereto and (b) returns to its normally spaced location from the surface in response to removal of the forces, a housing having a first cylindrical portion in which the solid dielectric, first electrode and second electrode are located, and a second cylindrical portion nested and friction-fitted with the first cylindrical portion.

8. A variable capacitor comprising a solid dielectric, a first electrode on the solid dielectric, a second flexible electrode normally spaced by a dielectric gas from a surface of the solid dielectric, the normal spacing between the second electrode and the surface and the flexibility of the second electrode being such that the second electrode (a) is urged into contact with and has differing contact areas with the surface in response to differing forces being applied thereto and (b) returns to its normally spaced location form the surface in response to removal of the forces, a mechanical drive mechanism for translating the flexible electrode into contact with said dielectric surface, said mechanical drive mechanism including an flexible membrane mechanically coupled to the flexible electrode for imparting said forces to the elastic electrode.

9. A variable capacitor comprising a solid dielectric, a first electrode on the solid dielectric, a second flexible electrode normally spaced by a dielectric gas from a surface of the solid dielectric, the normal spacing between the second electrode and the surface and the flexibility of the second electrode being such that the second electrode 9a) is urged into contact with and has differing contact areas with the surface in response to differing forces being applied thereto and (b) returns to its normally spaced location from the surface in response to removal of the forces, a stem mechanically coupled to the flexible electrode for imparting said forces to the flexible electrode, and a detachable end cap on an end of the portion of the stem for imparting forces imparted along the length of the stem to the flexible electrode.

10. An implement for supplying position and pressure indications to a tablet on which the implement is adapted to be used, the implement comprising a stem adapted to be displaced in response to pressing thereof against a surface of the tablet, an inductor connected in circuit with a variable capacitor having a variable capacity controlled by displacement of the stem, the variable capacitor including a solid dielectric having a dielectric constant in excess of 100 and fabricated of a material having a tendency to be damaged in response to relatively high voltage being applied to it, the inductor and variable capacitor being in a passive circuit having no power supply terminals connected to it to obviate the tendency of the solid dielectric to be damaged by the application of high voltage, the variable capacitor further including: a first electrode on the solid dielectric, a second flexible electrode mechanically coupled to the stem and normally spaced by a dielectric gas from a surface of the solid dielectric, the normal spacing between the second electrode and the surface and the flexibility of the second electrode being such that the second electrode (a) is urged into contact with and has differing contact areas with the surface in response to differing forces being applied thereto by the stem and (b) returns to its normally spaced location from the surface in response to removal of the forces.

11. The implement of claim 10 wherein the solid dielectric is a mixed metal oxide ceramic.

12. The implement of claim 10 wherein the flexible electrode has a flat polished surface.

13. The implement of claim 10 further including an annular dielectric spacer having an opening and opposite faces contacting facing faces of the electrode and dielectric surface, the electrode being urged through the opening from the normal position into contact with the dielectric surface.

14. An implement for supplying position and pressure indications to a tablet on which the implement is adapted to be used, the implement comprising an elongated housing having the shape of a pen and a longitudinal axis, the housing including a stem translatable in the direction of the axis by an amount controlled by the pressure exerted by a tip of the stem against a surface of the tablet, the housing including a variable capacitor mechanically coupled to the stem so that capacitance of the capacitor varies in response to translation of the stem in the direction of the axis, said capacitor including: a solid dielectric, a first dielectric on the solid dielectric, a second flexible electrode normally spaced by a dielectric gas from a surface of the solid dielectric while no force is applied to the stem, the normal spacing between the second electrode and the surface and the flexibility of the second electrode being such that the second electrode (a) is urged into contact with and has differing contact areas with the surface in response to differing forces being applied thereto by translation of the stem in the direction of the axis and (b) returns to its normally spaced location from the surface in response to removal of the forces.

15. The implement of claim 14 wherein the housing includes an inductor and the solid dielectric has a dielectric constant in excess of 100 and is fabricated of a material having a tendency to be damaged in response to relatively high voltage being applied to opposite surfaces thereof, the inductor and variable capacitor being in a passive circuit having no power supply terminals connected to it to obviate the tendency of the solid dielectric to be damaged by the application of high voltage.

16. The implement of claim 14 wherein the second electrode and the dielectric surface are positioned generally at right angles to the axis and the second electrode is translated in the general direction of the axis toward and into contact with the dielectric surface in response to translation of the stem from the normal position in the direction of the axis.

17. An implement for supplying position and pressure indications to a tablet on which the implement is adapted to be used, the implement comprising
an elongated housing, the housing including:
a stem longitudinally positioned in the housing adapted to be pressed against a surface of the tablet,
a translatable member adapted to be translated by varying amounts as a function of the width of a trace, and
a variable capacitor having a variable capacity controlled by displacement of the translatable member, the variable capacitor including: a solid dielectric, a first electrode on the solid dielectric, a second flexible electrode mechanically coupled to the translatable member and normally spaced by a dielectric gas from a surface of the solid dielectric, the normal spacing between the second electrode and the surface and the flexibility of the second electrode being such that the second electrode (a) is urged into contact with and has differing contact areas with the surface in response to differing forces being applied thereto by the translatable member and (b) returns to its normally spaced location from the surface in response to removal of the forces.

18. The implement of claim 17 wherein the dielectric constant is in excess of 100.

19. The implement of claim 18 wherein the solid dielectric is a mixed metal oxide ceramic.

20. The implement of claim 19 wherein the housing includes an inductor connected in a tuned circuit with the variable capacitor, the mixed metal oxide ceramic solid dielectric having a tendency to be damaged in response to relatively high voltage being applied to it, the inductor and variable capacitor being in a passive circuit having no power supply terminals connected to it to obviate a tendency of the solid dielectric to be damaged by the application of high voltage.

21. The implement of claim 20 wherein the flexible electrode has a flat polished surface.

22. The implement of claim 21 further including an annular dielectric spacer having an opening and opposite faces contacting facing faces of the flexible electrode and dielectric surface, the electrode being urged through the opening from the normal position into contact with the dielectric surface.

23. The implement of claim 22 wherein said translatable member includes a surface shaped as a segment of a sphere for imparting motion to the flexible electrode to cause the flexible electrode to initially always contact substantially the same region on the solid dielectric surface and to increase the contact area between the flexible electrode and the solid dielectric surface as the forces increase.

24. The implement of claim 23 wherein said surface of the solid dielectric is sufficiently smooth and flat that there are virtually no portions between the center and periphery of the contact area region where contact between the solid dielectric surface and the flexible electrode does not exist.

25. The implement of claim 24 wherein said surface of the solid dielectric is polished.

26. The implement of claim 25 wherein said surface of the solid dielectric has a roughness no greater than 0.1 micrometer.

27. The implement of claim 26 further including a subhousing having a first cylindrical portion in which the solid dielectric, first electrode and second electrode are located, and a second cylindrical portion nested and friction-fitted with the first cylindrical portion.

28. The implement of claim 27 wherein the translatable member includes an elastic membrane mechanically coupled to the flexible electrode for imparting said forces to the flexible electrode.

29. The implement of claim 28 wherein the stem is adapted to be translated longitudinally of the housing in response to pressing thereof against the tablet surface, the stem being coupled to the translatable member so that translation of the stem is accompanied by translation of the translatable member.

30. The implement of claim 29 wherein the translatable member includes a detachable end cap on an end of the portion of the stem for imparting forces imparted along the length of the stem to the flexible electrode.

31. The implement of claim 17 wherein the solid dielectric is a mixed metal oxide ceramic.

32. The implement of claim 17 wherein the solid dielectric has a tendency to be damaged in response to relatively high voltage being applied to it, and further including an inductor in the housing, the inductor and variable capacitor being connected to each other in a passive circuit having no power supply terminals connected to it to obviate a tendency of the solid dielectric to be damaged by the application of high voltage.

33. The implement of claim 17 wherein the flexible electrode has a flat polished surface.

34. The implement of claim 17 further including an annular dielectric spacer having an opening and opposite faces contacting facing faces of the flexible electrode and dielectric surface, the electrode being urged through the opening from the normal position into contact with the dielectric surface.

35. The implement of claim 17 wherein said translatable member includes a surface shaped as a segment of a sphere for imparting motion to the flexible electrode to cause the flexible electrode to initially always contact substantially the same region on the solid dielectric surface and to increase the contact area between the flexible electrode and the solid dielectric surface as the forces increase.

36. The implement of claim 17 wherein said surface of the solid dielectric is sufficiently smooth and flat that there are virtually no portions between the center and periphery of the contact area region where contact between the solid dielectric surface and the flexible electrode does not exist.

37. The implement of claim 17 wherein said surface of the solid dielectric is polished.

38. The implement of claim 17 wherein said surface of the solid dielectric has a roughness no greater than 0.1 micrometer.

39. The implement of claim 17 further including an annular spacer between the dielectric surface and the electrode for establishing the normal spacing, the electrode spacer and dielectric surface being arranged so that the electrode is flexed into contact with the dielectric surface through a central opening of the spacer.

40. The implement of claim 17 further including a subhousing having a first cylindrical portion in which the solid dielectric, first electrode and second electrode are located, and a second cylindrical portion nested and friction-fitted with the first cylindrical portion.

41. The implement of claim 17 wherein the translatable member includes an elastic membrane mechanically coupled to the flexible electrode for imparting said forces to the flexible electrode.

42. The implement of claim 17 wherein the stem is adapted to be translated longitudinally of the housing in response to pressing thereof against the tablet surface, the stem being coupled to the translatable member so that translation of the stem is accompanied by translation of the translatable member.

43. The implement of claim 17 wherein the translatable member includes a detachable end cap on an end of the portion of the stem for imparting forces imparted along the length of the stem to the flexible electrode.

44. A variable capacitor comprising a solid dielectric, a first electrode on the solid dielectric, a second flexible electrode normally spaced by a dielectric gas from a polished surface of the solid dielectric, the normal spacing between the second electrode and the surface and the flexibility of the second electrode being such that the second electrode (a) is urged into contact with and has differing contact areas with the surface in response to differing forces being applied thereto and (b) returns to its normally spaced location from the surface in response to removal of the forces.

45. A variable capacitor comprising a solid dielectric, a first electrode on the solid dielectric, a second flexible electrode normally spaced by a dielectric gas from a surface of the solid dielectric having a roughness no greater than 0.1 micrometer, the normal spacing between the second electrode and the surface and the flexibility of the second electrode being such that the second electrode (a) is urged into contact with and has differing contact areas with the surface in response to differing forces being applied thereto and (b) returns to its normally spaced location from the surface in response to removal of the forces.

* * * * *

UNITED STATES PATENT AND TRADEMARK OFFICE
CERTIFICATE OF CORRECTION

PATENT NO. : 5,206,785
DATED : April 27, 1993
INVENTOR(S) : Yasayuki HUKUSHIMA

It is certified that error appears in the above-identified patent and that said Letters Patent is hereby corrected as shown below:

On the title page, please amend the inventor's name as follows: item [75], change "Yasayuki" to --Yasuyuki--;

Please add the following foreign application priority data:

item [30]    Foreign Application Priority Data
   Aug. 6, 1990 [JP] Japan ..............2-206774--

Signed and Sealed this

Twenty-sixth Day of April, 1994

Attest:

BRUCE LEHMAN

Attesting Officer    Commissioner of Patents and Trademarks